Patented Dec. 23, 1941

2,266,813

UNITED STATES PATENT OFFICE 2,266,813

DIELECTRIC FOR ELECTROSTATIC CONDENSERS

Samuel Ruben, New Rochelle, N. Y.

No Drawing. Application May 3, 1939,
Serial No. 271,522

3 Claims. (Cl. 175—41)

This invention relates to electrostatic condensers and this application is a continuation in part of my copending application Serial No. 88,534, filed July 2, 1936.

An object of the invention is to improve the characteristics of an electrostatic condenser, for instance, to increase its capacity.

Another object is to provide an improved impregnant for electric condenser spacers.

Vegetable and other oils have been used heretofore for impregnating condenser spacers. When they are used to impregnate paper or cloth spacer condensers an improvement in capacity is obtained. However, there are certain disadvantages in the use of oil impregnated condensers. Since oil will flow at ordinary temperatures it is necessary, in the shipping and operation of such condensers, to take some precautions against the loss of oil. Likewise many unsaturated oils, such as castor oil, tend to oxidize when exposed to the air, resulting in reaction products such as water and acids which cause deterioration of the condenser.

The present invention comprises the use of a composite dielectric of hydrogenated castor oil and chlorinated naphthalene.

Hydrogenated castor oil, which is a hard, solid material, has long been known to the condenser art to possess a high dielectric constant but its application as a dielectric medium in an electrostatic condenser has not to date been practical because of its excessively high power factor and tendency to crack. In order to use hydrogenated castor oil as an impregnant, it is necessary to heat it up to liquification temperature so as to allow complete penetration of the absorbent paper spacers. As the oil cools and solidifies, however, minute cracks develop throughout the entire mass, thus bringing about low break down potentials and allowing absorption of moisture. The excessive power factor eventually brings about overheating and decomposition.

Solid chlorinated naphthalene has heretofore been used as a dielectric for electrostatic condensers but has proved satisfactory only in such applications where there is a very small temperature rise and where a large capacity per unit area is not necessary.

I have found that the combination of solid hydrogenated castor oil and solid chlorinated naphthalene produces a new dielectric which retains the high capacitance of hydrogenated castor oil but which is free from the limitations of the use of solid hydrogenated naphthalene alone. The composite material is not brittle and does not crack. The mixture readily liquifies when heated and satisfactorily impregnates wound foil type electrostatic condensers.

The dielectric may be made by heating the hydrogenated castor oil and solid chlorinated naphthalene together and prolonging the heating until a complete mixture takes place.

The proportions of hydrogenated castor oil to chlorinated naphthalene will depend upon the use to which the device is to be applied, cost limit, power factor and capacitance. The chlorinated naphthalene may be present in proportions of from 5% to 80%, it being miscible with hydrogenated castor oil throughout the entire range.

What is claimed is:

1. A dielectric for electrostatic condensers and the like comprising a solid mixture of hydrogenated castor oil and chlorinated naphthalene.

2. A dielectric for electrostatic condensers and the like comprising hydrogenated castor oil and from 5% to 80% solid chlorinated naphthalene.

3. A condenser having a dielectric comprising a mixture of hydrogenated castor oil and chlorinated naphthalene.

SAMUEL RUBEN.